L. S. CAMPBELL & J. GRANT.

COMBINATION BIT AND ROTARY UNDERREAMER.

APPLICATION FILED JAN. 2, 1917.

Reissued May 15, 1917.

14,301.

Inventors.
Lawrence S. Campbell
John Grant by. Edmund A. Stauber Atty.

UNITED STATES PATENT OFFICE.

LAWRENCE S. CAMPBELL, OF LOS ANGELES, AND JOHN GRANT, OF FLORENCE, CALIFORNIA; SAID CAMPBELL ASSIGNOR TO SAID GRANT.

COMBINATION BIT AND ROTARY UNDERREAMER.

14,301. Specification of Reissued Letters Patent. Reissued May 15, 1917.

Original No. 1,169,922, dated February 1, 1916, Serial No. 61,309, filed November 13, 1915. Application for reissue filed January 2, 1917. Serial No. 140,300.

*To all whom it may concern:*

Be it known that we, LAWRENCE S. CAMPBELL and JOHN GRANT, both subjects of the King of Great Britain, residing, respectively, at Los Angeles, in the county of Los Angeles, State of California, and Florence, in the county of Los Angeles, State of California, have invented new and useful Improvements in Combination Bit and Rotary Underreamers, of which the following is a specification.

This invention relates to improvements in combination bit and rotary underreamers in which the cutters are collapsed when shifted through the well casing.

The objects of this invention are, first, to provide a tool which is strong and reliable, and in which the operating parts are inclosed in a strong shell which has no holes or openings of any kind in working position as well as in collapsed position, preventing sand or other waste from entering the inside; second, to provide a tool in which the cutters are rigidly balanced against tilting inwardly or outwardly when expanded, and which may be collapsed upon protraction of the cutters from the shell; and third, to provide details of construction which insure strength and simplicity of structure, and ease of manipulation.

Referring to the drawing.

Figure 1:
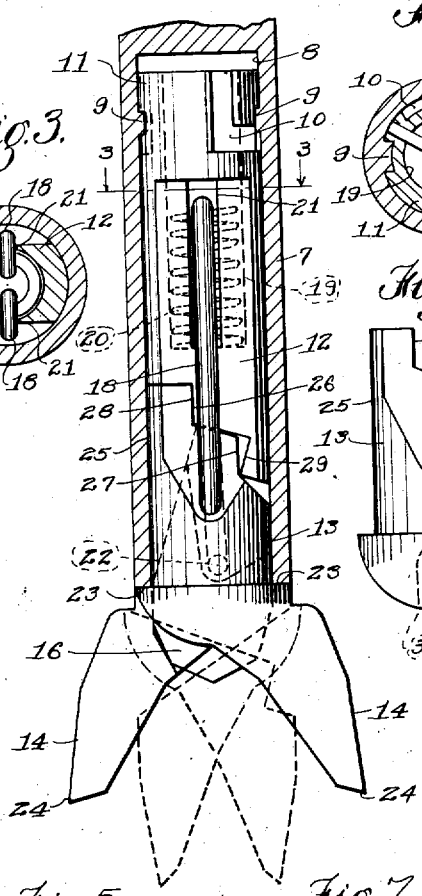
Figure 1 is a front view of our device, the outer shell being shown in section.

Numeral 7 indicates the lower end of a working shell in well-work. Shell 7 is provided with a concentric bore 8, into which all the operating parts of our device are inserted. Near the termination of bore 8 are projections 9 for engaging grooves 10 formed in the center-block 11. Projections 9 and grooves 10 can be had in a suitable number as will easily be understood, two being shown on the drawing, but one will usually be sufficient as it serves only to keep the center-block in position in the bore. A suitable distance below the grooves 10 the center-block is cut down to a flattened shaft 12, and near the lower end the shaft is still further reduced to receive the nearly semi-cylindrical shanks 13 of the cutters 14.

Figure 3:
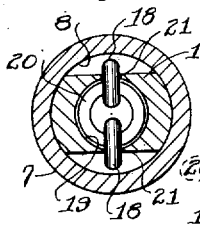
Fig. 3 is a cross section on the line 3—3 of Fig. 1.

The reduced portion is indicated by 15 and is extended below the shell forming an expander 16 for the cutters. The expander 16 is beveled at opposite edges and coöperates with adjacent faces on the inside of the cutters to expand the cutters, when they are retracted, and to brace them against collapsing. The expander 16 has lugs 17 formed on the opposite sides to prevent the cutters 14 from falling out in case of a break in the operating rods 18. Fig. 3 is a section just above the top ends of the operating rods 18 showing these rods in the spaces formed between the shell 7 and the flattened shaft 12; it also shows a concentric bore 19 inside of the flattened shaft for receiving a spring 20. The bore 19 also forms slots 21 in the sides of the center-block through which the operating rods are inserted to engage with the spring 20. The lower ends of the operating rods 18 are pivotally mounted in the holes 22 in the cutters 14. The tension of the spring 20, thus, pulls the cutters 14 into the shell by the operating rods 18, thereby retracting the cutters. The center-block 11, spring 20, and operating rods 18 form a cutter supporter.

The shanks 13 of the cutters 14 are constructed to form strong counter-levers and pounding surfaces. As the shell 7 forms a full ring end, the cutters are provided with shoulders or off-sets 23 to utilize this ring, forming a proportionately large pounding surface and a fulcrum for the cutters. The tilting movement caused by the cutting pressure against the cutting edges 24 of cutters 14 is counterbalanced by the resistance in the long surface along the edge 25 of the shanks 13. The opposite edge is mutilated and formed to prevent the cutters from collapsing, the edges 26 and 27 of the shank 13 engaging with the projections 28 and 29 on the flattened shaft. To make the cutters collapse, as indicated in dotted lines in Fig. 1, the cutters are pulled out of, or protracted from the shell far enough to disengage the edges 26 and 27 from the projections 28 and 29, the pulling being done against the tension of spring 20.

For taking our reamer apart in this collapsed position, the whole operating parts, cutter shanks and center-block can be pushed in a suitable distance to bring the projections 9 in the shell 7 to the horizontal part of the grooves 10 along which they may be turned to the vertical part of the groove, which are open to the upper end of the center-block 11.

Figure 6:
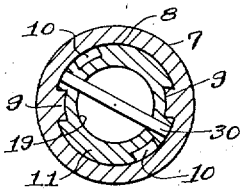
Fig. 6 is a cross section on the line 6—6 of Fig. 5.
Figure 5:
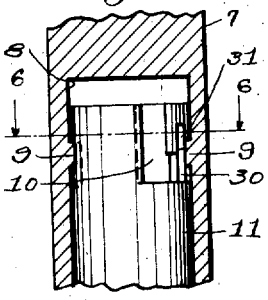
Fig. 5 is the top of Fig. 1 with a locking key inserted.

To prevent disengagement of the center-block from the shell while operating with our reamer in a well, we provide a locking key as shown in Figs. 5 and 6. The key 30 is a straight flat steel bar inserted into a slot 31 which is cut through the whole thickness of the center-block, but not through the shell. The key 30 when the underreamer is in an upright position will fall down to lock the projections 9 of the shell 7 in the grooves 10 of the center-block. The center-block can only be unlocked by turning the whole reamer up-side down.

Figure 7:
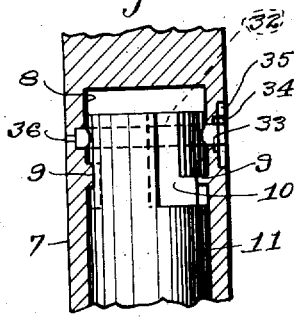
Fig. 7 is a modification of the locking device, a pin being inserted for the locking key.

A modification of our locking device is shown in Fig. 7, where a pin 32 is inserted through the shell and center-block. The pin 32 is provided with a projection 33 which can be inserted through a notch 34 in the washer 35. The projection 33 turns downwardly by its own gravity, and locks the pin behind the washer 35. The washer is riveted to the shell, or otherwise suitably secured thereto. At the opposite side of the shell 7 a small bore 36 is provided to drive out the pin 32.

Figure 8:
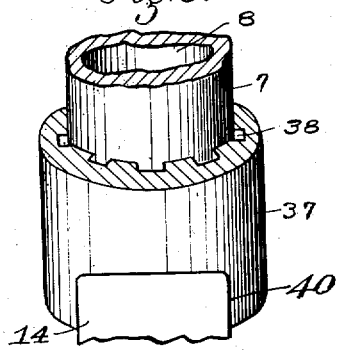
Fig. 8 is the lower end of the well casing constructed for using our device for rotary drilling.

For using our device as a rotary underreamer we provide the lower end 37 of a well casing with cut outs 40, see Fig. 8, to fit over our cutters 14. The lower end of the well casing being usually the shoe and of thicker metal, we provide channels 38 on the inside of these shoes to allow water to pass through to the cutting edges 24.

Figure 2:
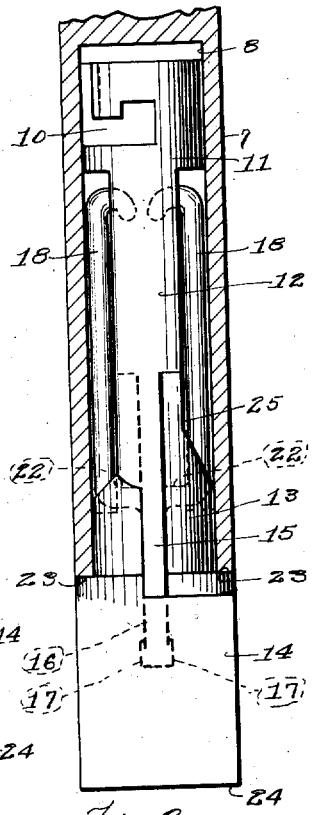
Fig. 2 is a side view, the shell being shown in section.
Figure 4:
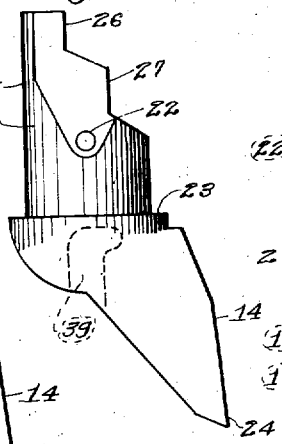
Fig. 4 is a single cutter.

In case of a break in the operating rods 18 the cutters 14 are provided with recesses 39, see Fig. 4, to engage with the lugs 17 on the expander 16, see Fig. 2, preventing the cutters from falling out of the shell.

What we claim is:

1. A device for the purpose described, consisting of a shell having a concentric bore with a projection formed near the inner termination of the bore, a center-block inserted into the bore of the shell being hollow at the upper end and flattened at the lower end, said center-block having a recess formed on the outside of the upper end adapted to engage with the projection in the bore of the shell, cutters having shanks formed on the upper ends designed to fit in the nearly semi-circular spaces left on both sides of the center-block in the shell, a spring inserted into the hollow center-block, and operating rods with the lower ends turnably secured to the shanks of the cutters and the upper ends engaged with the spring in the center-block for holding the cutters in operating position.

2. A device for the purpose described, consisting of a hollow shell, a center-block removably secured in the shell, cutters slidingly mounted in the space formed between the center-block and the shell, and a well casing being cut out at the lower termination to fit over the cutters designed for rotary drilling and having grooves provided along the inside of the lower thicker end in the casing adapted to allow water to pass to the cutters.

3. A device for the purpose described, consisting of a hollow shell terminating in a circular ring, a round center-block removably secured in the shell being hollow at the upper end and flattened at the lower end, projections formed on the flattened part of the center-block, cutters having shanks formed on the upper ends slidingly fitting in the nearly semi-circular spaces formed on both sides of the flattened center-block in the shell and having shoulders to utilize the ring termination of the shell for a pounding surface, the cutters having cutting edges on the lower end concentric to the center of the device, said shanks having straight edges parallel to the center of the device opposite to the cutting edges, the edge of the shank opposite to the straight edge and on the same side with the cutting edges being formed to engage with projections on the center block to prevent the cutters from collapsing, and operating means secured to the cutters adapted to hold the cutters in operating position.

4. In a device for the purpose described, a hollow shell, a center-block removably secured in the shell being flattened at the lower end, cutters slidingly mounted in the spaces formed between the flattened center-block and the shell, said center block having lugs formed on the termination of the flattened end, and said cutters having recesses formed on the sides toward the center-block adapted to engage with the lugs on the center-block to prevent the cutters from falling out.

5. In a device for the purpose described, a hollow shell, a center-block removably secured in the shell being flattened at the lower end, cutters slidingly mounted in the spaces formed between the flattened center-block and the shell, said center-block terminating below the shell having means thereon to prevent the cutters from collapsing and also adapted to serve as a guide to bring the cutters into operating position, and operating means secured to the cutters, adapted to hold the cutters in operating position, all substantially as described.

6. In a device for the purpose described, the combination of a hollow shell, a center-block removably secured in the shell being flattened at the lower end, said center-block being also provided with a slot crosswise through the upper end, cutters slidingly mounted in the spaces formed between the flattened center block and the shell, operating means secured to the cutters and suitably supported by the center-block adapted to hold the cutters in operating position, and a locking key inserted through the slot in said center block adapted to prevent disengagement of said shell and center block.

7. In a device for the purpose described, the combination with a hollow shell and a center-block removably secured in the shell being flattened at the lower end, of cutters having shanks on the upper ends slidingly mounted in the nearly semi-circular spaces formed on both sides of the flattened center-block in the lower end of the shell and having cutting edges formed on the lower ends of the cutters projecting off the shell in right angles to the flat side of the nearly semi-circular shanks.

8. In a device of the class described, the combination with a hollow shell, of cutters slidingly mounted therein; and a cutter supporter normally fixed within said shell, said supporter comprising means slidingly and pivotally securing said cutters to said supporter so that said cutters may be collapsed on protraction of the latter, and means located so as to be interposed between said cutters to expand and prevent collapse of the latter when retracted.

9. In a device of the class described, the combination with a hollow shell, of cutters slidingly mounted therein; a cutter supporter normally fixed within said shell; said supporter comprising means slidingly and pivotally securing said cutters to said supporter so that said cutters may be collapsed on protraction of the latter, means located so as to be interposed between said cutters to expand and prevent collapse of the latter when retracted; and means tending to retract said cutters.

10. In a device of the class described, the combination with a hollow shell, of cutters slidingly mounted therein, said cutters having an off-set disposed to engage the lower face of said shell; and a cutter supporter normally fixed within said shell, said supporter comprising means slidingly and pivotally securing said cutters to said supporter so that said cutters may be collapsed on protraction of the latter, and means located so as to be interposed between said cutters to expand and prevent collapse of the latter when retracted.

11. In a device of the class described, the combination with a hollow shell, of cutters slidingly mounted therein, said cutters having an off-set disposed to engage the lower face of said shell; a cutter supporter normally fixed within said shell, said supporter comprising means slidingly and pivotally securing said cutters to said supporter, so that said cutters may be collapsed on protraction of the latter, means located so as to be interposed between said cutters to expand and prevent collapse of the latter when retracted; and means tending to retract said cutters.

12. In a device of the class described, the combination with a hollow shell, of cutters having shanks slidingly disposed within said shell and disposed to engage the wall of the bore of said shell, said cutters provided with off-sets disposed to engage the lower face of said shell and coöperate therewith to prevent tilting of the cutters outwardly; and a cutter supporter normally fixed within said shell, said supporter comprising means slidingly and pivotally securing said cutters to said supporter so that said cutters may be collapsed on protraction of the latter, and means located so as to be interposed between said cutters to expand and prevent collapse of the latter when retracted.

13. In a device of the class described, the combination with a hollow shell, of cutters having shanks slidingly disposed within said shell, said cutters provided with off-sets disposed to engage the lower face of said shell and coöperate therewith to prevent tilting of the cutters outwardly; a cutter supporter normally fixed within said shell, said supporter comprising means slidingly and pivotally securing said cutters to said supporter so that said cutters may be collapsed on protraction of the latter, means located so as to be interposed between said cutters to expand and prevent collapse of the latter when retracted; and means tending to retract said cutters.

14. In a device of the class described, the combination with a hollow shell, of cutters having shanks slidingly mounted within said shell, said cutters pivotally mounted with respect to one another, the near faces of said shanks being in planes at right angles to the cutting edges of said cutters, said shanks disposed to engage the wall of the bore of said shell, off-sets on said cutters disposed to engage the lower face of said shell and coöperate with said shanks to prevent tilting of the cutters outwardly, said shell being provided with means affixed thereto and interposed between said cutters to expand the latter on retraction of said cutters and to permit collapse of the cutters on protraction.

15. In a device of the class described, the combination with a hollow shell, of cutters having shanks slidingly mounted within said shell, said cutters pivotally mounted with respect to one another, the near faces of said shanks being in planes at right angles to the cutting edges of said cutters, said shanks disposed to engage the wall of the bore of said shell, off-sets on said cutters disposed to engage the lower face of said shell and co-operate with said shanks to prevent tilting of the cutters outwardly, said shell being provided with means affixed thereto and interposed between said cutters to expand the latter on retraction of said cutters and to permit collapse of the cutters on protraction, and means tending to retract said cutters.

16. In a device of the class described, the combination with a hollow shell, of a pair of collapsible cutters, a cutter supporter mounted in said shell, said cutters having nearly semi-cylindrical shanks, the planes of the near faces of said shanks being substantially at right angles to the cutting edges of said cutters, shoulders on said cutters disposed to engage the lower face of said shell forming a complete ring about the pair of cutters, and means to slidingly and pivotally support said cutters from said supporter.

17. In a device of the class described, the combination with a hollow shell, of a pair of collapsible cutters slidingly mounted in said shell, said cutters having nearly semi-cylindrical shanks, the planes of the near faces of said shanks being substantially at right angles to the cutting edges of said cutters, shoulders on said cutters disposed to engage the lower face of said shell forming a complete ring about the pair of cutters, means to slidingly and pivotally support said cutters from said shell, and means affixed to said shell disposed so as to be interposed between said cutters when expanded.

18. In a device of the class described, the combination with a hollow shell, of a pair of collapsible cutters slidingly mounted in said shell, said cutters having nearly semi-cylindrical shanks, the planes of the near faces of said shanks substantially at right angles to the cutting edges of said cutters, shoulders on said cutters disposed to engage the lower face of said shell forming a complete ring about the pair of cutters; and a cutter supporter affixed to said shell comprising means slidingly and pivotally supporting said cutters, and means disposed so as to be interposed between said cutters when expanded.

19. In a device of the class described, the combination with a hollow shell, of a pair of collapsible cutters, said cutters having nearly semi-cylindrical shanks, the planes of the near faces of said shanks being substantially at right angles to the cutting edges of said cutters, shoulders on said cutters disposed to engage the lower face of said shell forming a complete ring about the pair of cutters, means to slidingly and pivotally support said cutters from said shell, and means tending to retract said cutters.

20. In a device of the class described, the combination with a hollow shell, of a pair of collapsible cutters slidingly mounted in said shell, said cutters having nearly semi-cylindrical shanks, the planes of the near faces of said shanks being substantially at right angles to the cutting edges of said cutters, shoulders on said cutters disposed to engage the lower face of said shell forming a complete ring about the pair of cutters, means to slidingly and pivotally support said cutters from said shell, means affixed to said shell disposed so as to be interposed between said cutters when expanded, and means tending to retract said cutters.

21. In a device of the class described, the combination with a hollow shell, of a pair of collapsible cutters slidingly mounted in said shell, said cutters having nearly semi-cylindrical shanks, the planes of the near faces of said shanks substantially at right angles to the cutting edges of said cutters, shoulders on said cutters disposed to engage the lower face of said shell forming a complete ring about the pair of cutters; and a cutter supporter affixed to said shell comprising means slidingly and pivotally supporting said cutters, means disposed so as to be interposed between said cutters when expanded, and means tending to retract said cutters.

LAWRENCE S. CAMPBELL.
JOHN GRANT.